Figure 1:
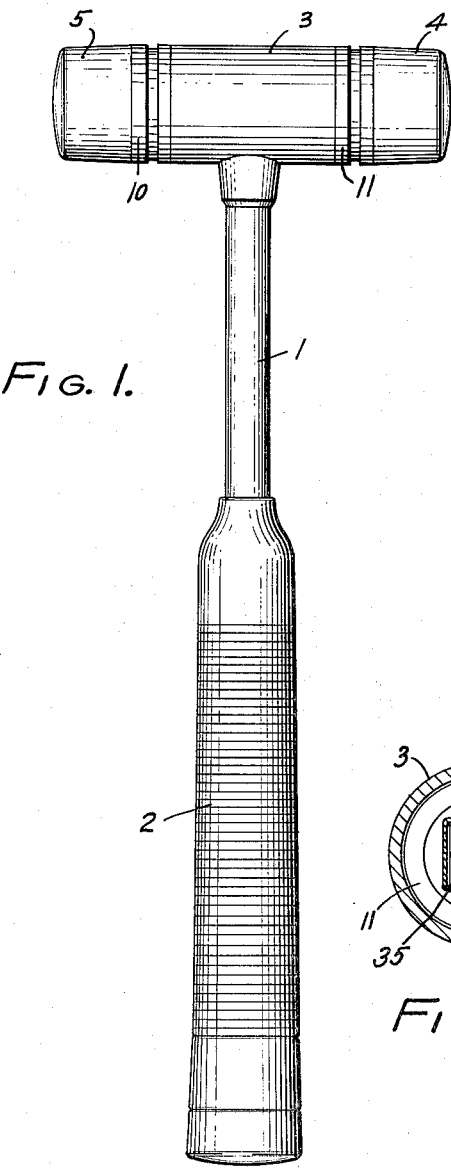

June 20, 1961 J. A. CARMIEN 2,989,101
HAMMERS
Filed Aug. 1, 1958 5 Sheets-Sheet 1

INVENTOR,
J. ALLEN CARMIEN;
BY
ATTORNEY

June 20, 1961    J. A. CARMIEN    2,989,101
HAMMERS
Filed Aug. 1, 1958    5 Sheets-Sheet 2

INVENTOR,
J. ALLEN CARMIEN,
BY
ATTORNEY

June 20, 1961  J. A. CARMIEN  2,989,101
HAMMERS
Filed Aug. 1, 1958  5 Sheets-Sheet 3

INVENTOR,
J. ALLEN CARMIEN;
BY
ATTORNEY

June 20, 1961  J. A. CARMIEN  2,989,101
HAMMERS
Filed Aug. 1, 1958  5 Sheets-Sheet 4
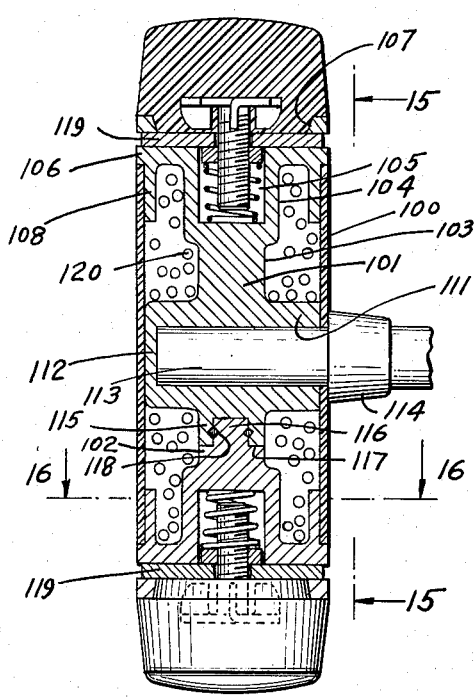
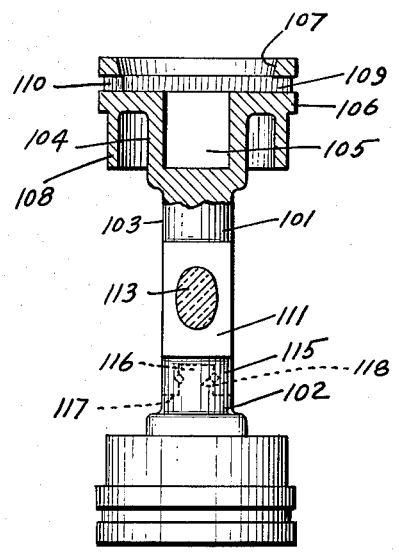
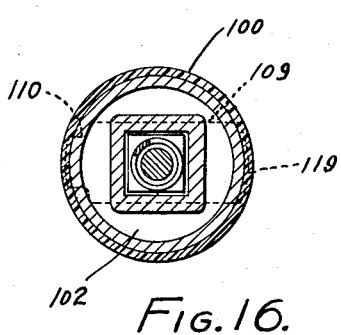
INVENTOR,
J. ALLEN CARMIEN;
BY
ATTORNEY

INVENTOR,
J. ALLEN CARMIEN;

United States Patent Office 2,989,101
Patented June 20, 1961

2,989,101
HAMMERS
Joseph Allen Carmien, Beverly Hills, Calif., assignor to New Plastic Corporation, Los Angeles, Calif., a corporation of Delaware
Filed Aug. 1, 1958, Ser. No. 752,492
2 Claims. (Cl. 145—36)

The present invention relates broadly to hammers, and more specifically to a type of hammer so constructed and arranged as to provide for removable and replaceable percussion tips. The percussion tips may be formed of selected materials having various degrees of hardness or having other characteristics which suitably qualify the same for given uses. Thus, I may use plastic tips having various degrees of hardness, or tips made from other materials.

In discussing the objects, I shall use certain terminology to define the hammer, viz, the hammer body which consists of a body, shaft and grip, shall be called the holder; the percussion faces shall be termed interchangeable, replaceable tips.

Essentially, a hammer body with removable, replaceable and interchangeable percussion tips is built for the purpose of being able to replace these tips when they become worn. Therefore, it follows that the body into which the percussion tips must be attached, should be non-perishable while the removable or interchangeable faces should be considered perishable.

A fundamental object of the invention is to provide a hammer holder made as non-perishable as possible. The holder is designed so that it completely eliminates the possibility of any failure for whatever cause due to the accidental or inadvertent failure to properly affix the tip or percussion face of the body.

With this object in mind, I have provided a holder which, when used in conjunction with tips, utilizing a threaded stud, will eliminate failure at the only vulnerable spot of the tool for the purpose of achieving optimum non-perishability.

The threaded stud for a tip acts in conjunction with a nut carried by the hammer holder, and a further object is to provide a construction whereby there is no impact stress on the threads of the stud or of the nut, regardless of whether or not the tip is properly seated in the body.

A further object is to provide a hammer of durability which will not cause damage to painted, plated or finely machined surfaces and having long life, replaceable and interchangeable percussion tips of various hardnesses.

Other objects include a hammer which is inexpensive in cost of manufacture, and generally superior to hammer constructions now known to the inventor.

With the above mentioned and other objects in view, the invention consists in the novel and useful provision, formation, construction, association, and relative arrangement of parts, members and features, all as shown in certain embodiments in the accompanying drawings, described generally, and more particularly pointed out in the claims.

Figure 2:
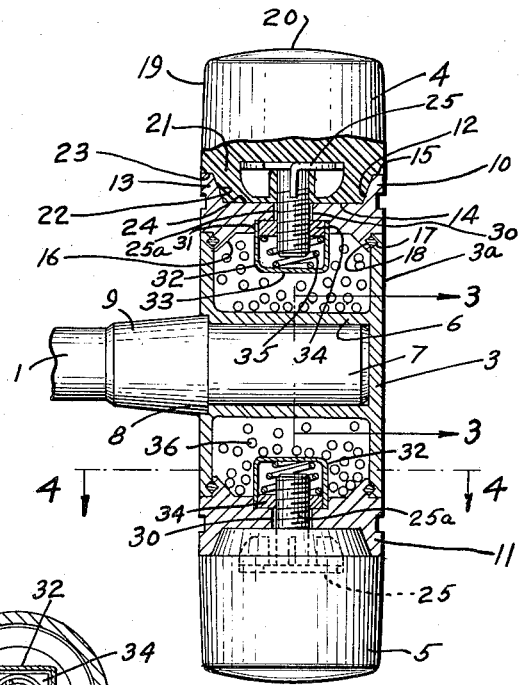
Figure 4:
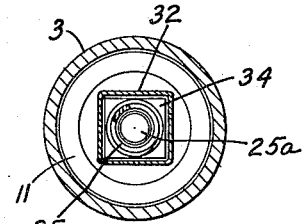
Figure 3:
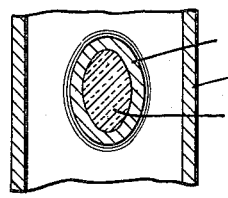
Figure 5:
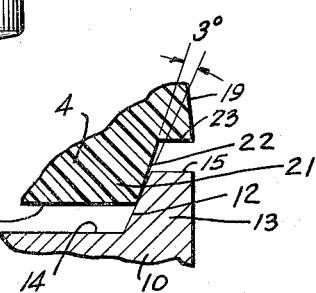
Figure 6:
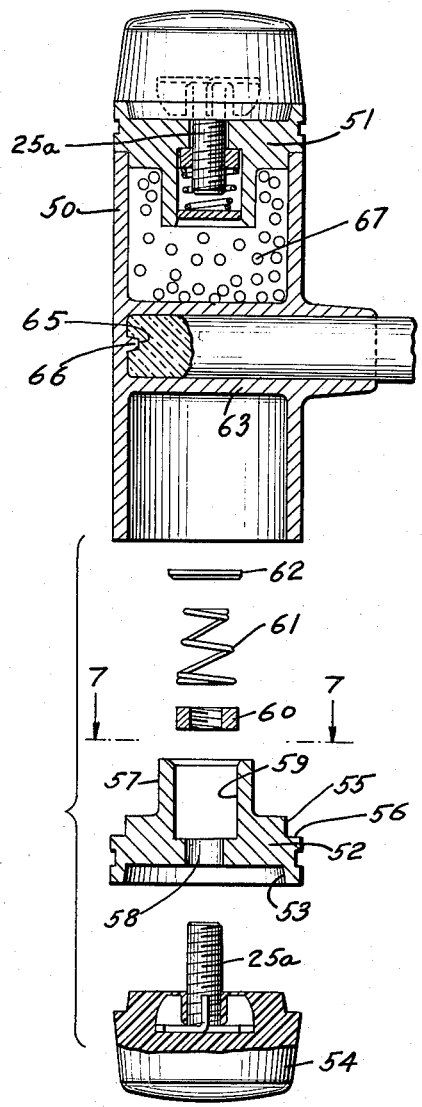
Figure 7:
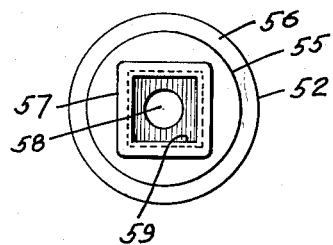
Figure 8:
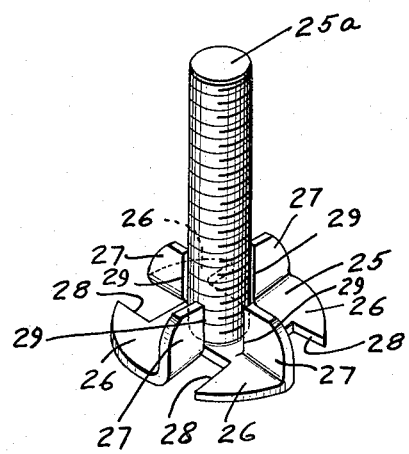
Figure 9:
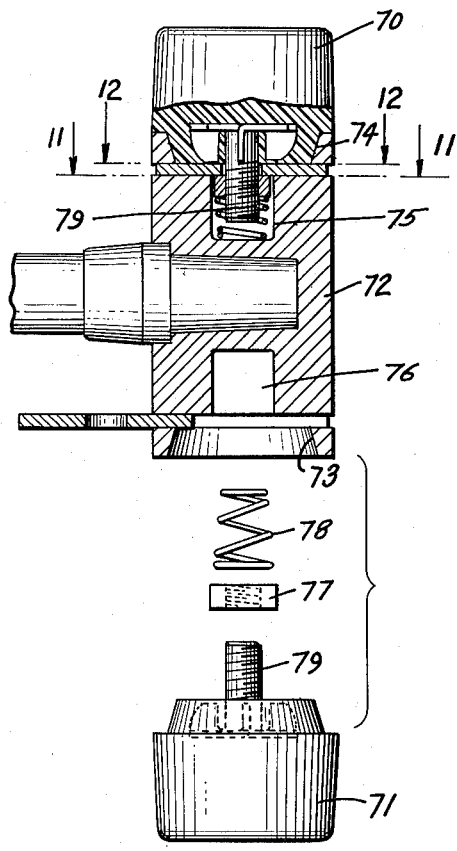
Figure 10:
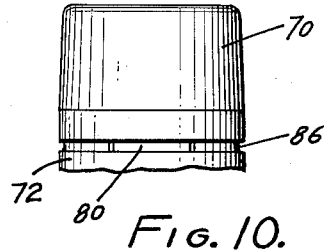
Figure 11:
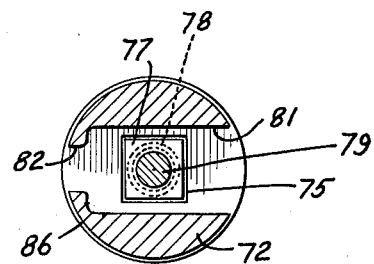
Figure 12:
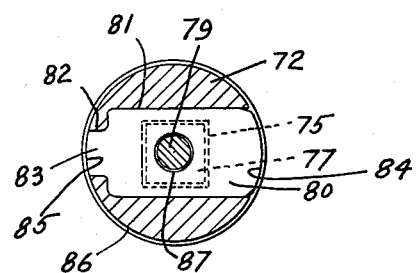
Figure 13:
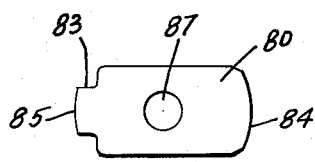
Figure 17:
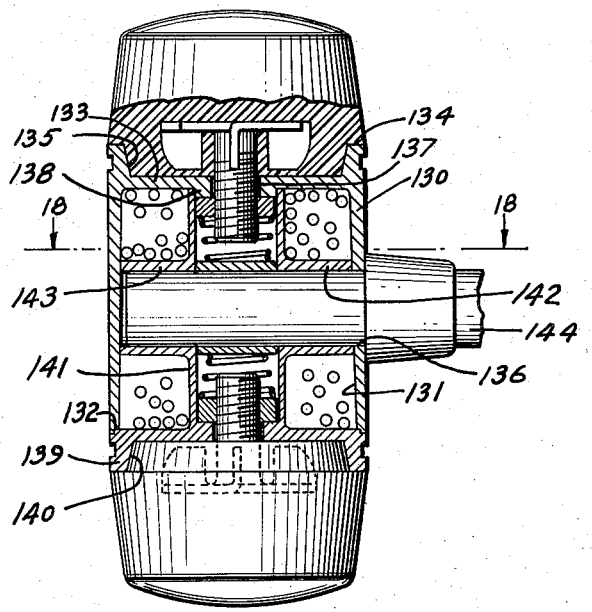
Figure 18:
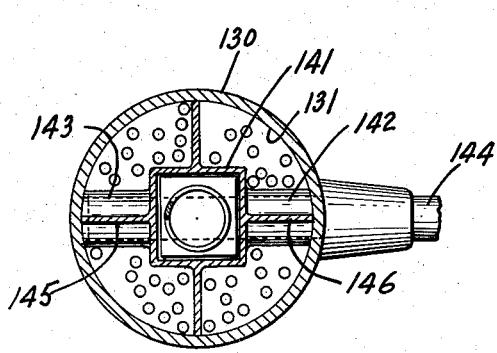
Figure 19:
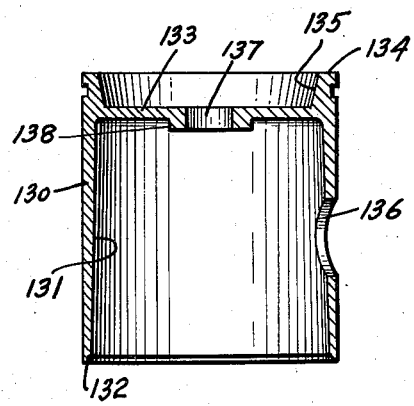
Figure 20:
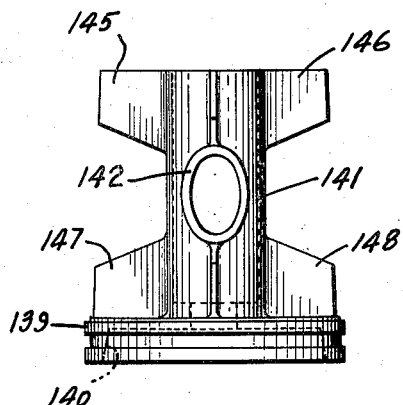

In the drawings:

FIGURE 1 is a side elevation of a hammer which may incorporate the different constructions illustrated in the remaining figures of the drawings, FIGURE 2 is a fragmentary, longitudinal transverse sectional view, of one form of my invention, FIGURE 3 is a fragmentary sectional view on the line 3—3 of FIGURE 2, FIGURE 4 is a sectional view on the line 4—4 of FIGURE 2, FIGURE 5 is a fragmentary sectional view of a relationship which may exist between a tip and its receiving socket in the holder body, FIGURE 6 is an exploded view of a modified form of construction for the holder body and tip, FIGURE 7 is a view looking in the direction of the arrows 7—7 of FIGURE 6, FIGURE 8 is a perspective view of means used in the tip for securing the tip to the holder body, said view being on an enlarged scale, FIGURE 9 is a fragmentary sectional view on an enlarged scale, parts being shown in exploded position, of a further modification of the hammer construction, FIGURE 10 is a fragmentary elevation of the tip shown assembled to the holder body, FIGURE 11 is a sectional view on the line 11—11 of FIGURE 9, FIGURE 12 is a sectional view on the line 12—12 of FIGURE 9, FIGURE 13 is a plan view of a locking blade used with that form of the invention illustrated in FIGURE 9, FIGURE 14 is a vertical section of a further modified form of holder body and tip construction, FIGURE 15 is a fragmentary, partially sectional elevation, looking in the direction of the arrows 15—15 of FIGURE 14, FIGURE 16 is a sectional view on the line 16—16 of FIGURE 14, FIGURE 17 is a fragmentary, cross sectional elevation of a further modified form of holder body and tip construction, FIGURE 18 is a sectional view on the line 18—18 of FIGURE 17, FIGURE 19 is a transverse sectional view of one member of the holder body shown in FIGURE 17, and, FIGURE 20 is an elevation of a second member of said holder body.

Referring now to the drawings, and specifically to the construction shown in FIGURES 1 to 5, inclusive, I have provided a holder having a shaft 1, the shaft provided with a grip 2, the said shaft carrying a body 3, opposite ends of said body being provided with percussion tips 4 and 5, of identical construction, although the said percussion tips may differ in material, hardness, and softness.

As a rule, in the various constructions illustrated in the several sheets of the drawings, the shaft 1 is formed from a plastic reinforced with fibre glass, or other material, to provide reinforcement, and the grip 2 may be formed of any material desired and affixed to the shaft by bonding, molding, or in any other appropriate manner as, for instance, by the use of a semi-flexible vinyl compound if the hammer is to be used in a location that requires resistance to petroleum products, or industrial acids, although the grip may, in other instances, be rubber, polyethylene, leather, a phenolic or other plastic. So far as the shaft is concerned, while I have stated that this may be made of reinforced fibre glass, still other types of shafts may be utilized, depending upon the use of the hammer, such as metal, wood, and other types of plastics. I have specifically mentioned reinforced fibre glass, because it provides the optimum strength in the driection of the loading, and is completely impervious to petroleum products, and common industrial acids, and is not attacked by fungus, dry rot, beetles, termites, mildew, and has comparatively high strength factors at low temperatures. In this connection, it may be mentiond that wooden handles cannot be used in the Polar regions for the reason that the handle will snap and break when a blow is struck by the user of the hammer. Reinforced fibre glass resists breakage.

The holder body 3 may be formed of any material desired, depending upon use of the invention, and it may be formed of high impact material in the polyvinyl chloride field, or it may be formed of a metal, such as zinc or aluminum, or other metal, and plastics. Thus, in FIGURE 2, the body is shown as having a shell 3ª provided with an integral and internal transverse elliptical sleeve 6, which is closed at one end by the shell, the opposite end being open, whereby the shaft end 7, also of elliptical form, may be socketed within said sleeve 6. The shell is shouldered adjacent the open end of sleeve 6, at 8, so as to receive an end of a ferrule 9 carried on the shaft. The shaft end 7 is confined within sleeve 6, and held thereto in any appropriate manner, such as by using a polyester bond, such as an epoxy resin. The construction shown for receiving the shaft end 7 assures that dirt cannot enter, due to the smooth closed end of the sleeve and by the seal effected by the reception of the ferrule within and upon the shouldered portion 8.

Forming a part of the body shell 3ª are end caps 10 and 11 of identical construction and, accordingly, the cap 10 will be described. This cap, on its outer surface, is provided with a socket or seat portion 12, the bounding side wall 13 of which is at an angle to vertical; in other words, a conical surface, the base 14 being flat. The end of the cap has an annular flat or plane surface 15 which lies between the conical surface 13 and the periphery of the cap. The opposite end of the cap is provided with a triangular sectioned flange 16, the periphery of which flange is received within the shell 3. To secure the flange and the shell together, I have provided on the inner face of the shell and the outer face of the flange, annular opposed grooves 17 and 18, respectively, and at the time of fitting the said caps to ends of the said shell 3ª, a plastic bond is inserted in said grooves. The bond, upon hardening, will firmly secure the caps to the shell. No particular type of bond is contemplated, although the bond should have high strength and be resistant to shear. In lieu of a plastic bond, I may, of course, utilize any ordinary method of securing the parts in working relationship, such as by staking, pinning, press-fit, screwing, soldering, welding, or brazing.

The tips 4 and 5 may be formed of any material desired, dependent upon use of the hammer. The tips 4 and 5 may be of plastic of varying degrees of hardness and softness, or the tips may be formed of metal or other material. However, I am assuming for the present that a plastic is used. Both tips 4 and 5 are of identical construction although, as stated, they may differ as to hardness and softness and, accordingly, the tip 4 will be described.

The tip 4 has a slightly tapered side wall 19, although it is conceivable that the side wall may be of cylindrical form, with its striking face 20 shown as slightly convex. However, any face shape required for the work to be done, such as conical, square, dome, flat, cross peen, ball peen, may be used. The tip 4 is provided with a seat or abutment portion 21 having a tapered or conical surface 22 and an annular shoulder 23 which extends between the side wall 19 and the tapered surface, the base 24 being flat. As shown in FIGURE 5, I prefer that the taper or angle of the surface 22 to vertical be less than the taper or angle to vertical of the wall 13 of the cap, such as shown in FIGURE 5 as approximately three degrees (3°). In other words, when the tip 4 is received within the hammer holder seat, the seat portion of the tip will contact the tapered or conical side wall of the cap. Thus, the edge of the base of the tip contacts the wall 13 of the cap prior to a complete seating and thereby exerts a pressure which distorts the seat portion of the tip and secures the tip from vibrating loose from the cap during use of the hammer.

In order to secure the tip to the cap portion of the hammer holder, I have provided means which assures a connection therebetween which will not work loose under vibration and impact when the tool is in use, and likewise a means which readily permits interchangeability and replacement of the tip to the said holder. Specifically, I contemplate a threaded type of connector means between each tip with the cap of the hammer holder. In FIGURE 8, I show one member of said connecting means, which constitutes a screw-threaded stud 25ª provided with a head 25. The said stud head, which initially may comprise a flat disk normal to the axis of the screw-threaded stud, is notched and bent so as to provide two or more, and, in this instance, four plane members, designated generally as 26, which lie in the same plane, and wings 27 bent substantially at right angles to the members 26. Thus, in the construction shown in FIGURE 8, pairs of vertical wings 27 are in alignment with the wings separated approximately ninety degrees (90°). Such a construction provides notches or open spaces at 28. In the construction shown, it is to be observed that the wings 27 have edges 29 contiguous to the threaded stud and spaced from said stud. The head is adapted to be embedded within the tip 4, as shown in FIGURE 2, with the threaded stud projecting beyond the base of said tip and on the axis of said tip. Due to wing and notched formation of the baffle head 25, the material of the impact tip 4 surrounds all portions of said baffle head. It will be observed that the portions 26 lie in the same plane, and that percussion on the convex surface 20 of the tip 4 will have impact pressure communicated to said portions 26. However, the material which surrounds the wings and is received through the notched portions, thoroughly locks the baffle head within the material and in such a manner as to preclude any turning or rotation thereof within the tip. In fact, tests which I have made show that the threaded stud will break prior to any turning of the baffle head within the tip. It is to be observed that the wings 27 lie within the seat portion 21 of the tip and likewise that seat portion 21 is adapted to be positioned within the bounding side wall 13 of socket 12 of the holder body, whereby the tip material, even if very flexible, is held and prevented from expanding if any rotation of the stud is attempted.

The cap 10 is provided with an axial bore 30 of a diameter slightly greater than the diameter of the threaded stud 24, and provided with a counterbore 31 having a configuration other than round, the counterbore adapted to receive in part a cage or cup 32 in such a manner as to have the cage depend from said cap. The cage has a closed end wall 33. Within the cage is a nut 34 which has the same outline or is complementary to the inner surface of the cage which, in this instance, is square, and hence, the nut is square sided. The nut is adapted to move within the cage without binding, and said nut is adapted to engage the threads of the stud 24. Within the cage and interposed between the nut and the end wall 33 of the cage is a helical compression spring 35. The compression spring constitutes a simple resilient means between the nut and wall 33 of the cage, and other resilient means may, of course, be utilized, such as, for instance, a rubber pad, or, in certain instances, hydraulic means, or even air, to the end that the nut is always urged in one direction, to-wit, outwardly of the cage.

When the tip 4 is completely seated, that is when the seat of the cap and of the tip is in the position shown in FIGURE 2, the end of the threaded stud does not bottom against the wall 33 of the cage.

In the construction shown in FIGURE 2, it is evident that the cage may assume any angular outline desired as long as the sides of the nut conform to such outline and are complementary to the outline. If it is desired to have the cage side wall circular in form and the side wall of the nut likewise circular, then the nut would be provided with a keyway and the cage side wall provided with a key fitting said keyway, or vice versa, to the end that there is no relative turning movement between the cage and the nut.

FIGURE 2 likewise shows a construction whereby upon striking an object, with the hammer, there is no rebound of the head. This is accomplished by filling the space included between the two cap members and the inner surface of the shell with a mass of material indicated as 36. This mass may comprise sand, shot, or other loose material which is capable of moving within this chambered portion of the body. The mass must be a shifting one, and of sufficient weight that when a blow is struck by the hammer tip, the inertia of the material in the chamber moving in the direction of the blow will counteract any tendency of the hammer tip to recoil or rebound.

It is no doubt obvious as to the assemblage of the device, such as shown in FIGURE 2, in that one of the caps, say 11, is already secured to the shell as may likewise the shaft of the handle, while the other end cap has not been applied to the shell. The chamber within the shell is then filled with the weighted material, whereupon the cap is bonded or otherwise secured to the shell. The tips may have previously been secured within the seat portions of the caps or they may be secured after the caps, and the weighted material has been placed in position. Assuming that the tips 4 and 5 are to be secured or seated to the caps, the threaded studs will be passed through the bores 30 for engagement with the nuts, each compression spring 35 urging a nut against a cap, as shown in FIGURE 2, whereupon the tips are tightened against their respective seats, that is, each tip seat is receiveod within a holder body seat in the manner previously explained for FIGURE 5. If a tip should become loose relative to the seat of the seat of the cap, upon a blow being struck by the hammer, the threads of the nut and threaded stud would not be damaged due to the fact that the nut is floating within the cage, being pressed upwardly by the compression spring 35. It is quite evident that if the threads of the stud and the nut were in a fixed relationship, that is, the nut not able to float, then any blow upon the tip would have to be absorbed by the threads, with resultant failure and damage to the threads which, of course, would not permit interchangability and replacement of the tips. However, in the present structure, the threads do not take the force of any blow, and the nut, as well as the threaded stud, due to the presence of the compression spring, are always urged upwardly within the cage.

In the event that the threaded stud of a tip is not even engaged by the nut in the holder and a force drives the tip into a fully seated position in the holder, the coil spring will compress and the nut will move downward in its chamber, but before there is any load on the bottom of the cage, the tip will find its full and proper seat in the holder. Thus, no load which might damage the threaded stud or nut can occur inasmuch as the insert tip will always seat in the holder before the nut and/or spring bottoms. Further, it can be seen that this situation will be true infinitely from the beginning of contact of tip stud and nut to its final lock in a properly seated position.

Referring to FIGURES 6 and 7, the hammer has a shell 50 of cylindrical form provided with end caps 51 and 52. As the end caps are of identical construction, one thereof will be described. End cap 52 is provided on its outer face with a socket 53 which constitutes a seat portion for the tip, here designated as 54, the said cap having a reduced diameter portion 55 to provide a shoulder at 56 permitting the cap to fit within the confines of the shell 50 and have a flush surface engagement with said shell and a further reduced diameter portion 57. The cap is centrally bored at 58 and provided with an enlarged counterbore at 59 which opens outwardly of the said cap. The counterbore, in the present instance, is of square outline, as shown in FIGURE 7, although it may be of any other outline other than round, the outline of said counterbore being complementary to the angular sides of a nut 60. A spiral compression spring 61 is adapted to bear against nut 60 when said nut and said spring are received within the counterbore 59, with the spring held in pressure engagement with the nut by means of an end plate 62 secured to the end of the reduced diameter portion 57, as shown in FIGURE 6. The end plate 62 may be secured either within or to the reduced diameter portion 57 through the use of a bonding material. The tips are provided with the structure shown in FIGURE 8, and which has previously been described. The shell 50 is identical with the construction shown in FIGURE 2, except that the shaft receiving portion 63 communicates with an external annular flange. The inner end of the shaft is provided with a kerf 65 receiving a key 66 formed within the shaft receiving portion of the shell.

So far as assemblage of the hammer shown in FIGURE 6 is concerned, its assemblage is the same as that for the structure shown in FIGURE 2, the shell and the cap 52 being secured together by suitable bonding material. It is quite obvious that the portion 57 of cap 52 constitutes a cage which is integral with the cap, while in the case of the structure of FIGURE 2, the cage is a separate entity. As is the case for the structure of FIGURE 2, the shell may be filled between the cap ends with weighted material 67 to provide for non-rebound or recoil of the hammer.

Referring to FIGURES 9 to 13, inclusive, I provide, as before, tips 70 and 71 having the connecting means of FIGURE 8. The holder body 72 is preferably of solid construction, as distinguished from the shell-like construction shown in FIGURES 2 and 6. Hence, this particular type of holder body is not adapted to confine weighted material, to provide a so-called non-rebound hammer. The solid body 72 may be of plastic, metal, or other material, depending upon use of the hammer, and the solid head may be, as shown, of cylindrical form, provided with taper-walled end sockets 73 and 74, which function as body seats for the tips. The holder body is internally bored inward from each end thereof, as shown at 75 and 76, each bore being angular-sided and, in the present instance, square, as shown in FIGURE 11. These bores 75 and 76 act as cages for the nuts 77 and coil compression springs 78. Thus, as shown, the coiled compression springs are placed within each portion 75 and 76 followed by the nuts 77 which are constantly urged outwardly of said bores, the said threaded studs, designated generally as 79, of the tips being in threaded engagement with said nuts. To prevent the nuts 77 from escaping from said bores, I have provided a blade structure for each end of the body of the type shown in FIGURE 13 and here designated as 80. Each end of the body is provided with a diametric slot 81, which is reduced in width at 82. This slot is adapted to receive the blade 80, the reduced width end 82 of the slot receiving a narrow width extension 83 of the blade. Ends of the blade are curved at 84 and 85 conforming to the curvature of the body. In addition, each end of the body is provided with an annular groove 86 which lies in the plane of the slots 81 and 82. The length of the blade 80 is such as to have its curved ends 84 and 85 merge with the curvature of the base wall for the annular slot 86, as shown in FIGURE 12. The blade is provided with a bore 87. Prior to inserting the threaded stud of a tip into the said body for engagement with a nut 77, the said blade is brought into position within its slot so that the bore 87 is in alignment with the threaded bore of the nut, the said blade holding the nut in the position shown in FIGURE 9. This construction provides another means whereby the nut may be held in position of service for receiving the threaded stud of a tip. After the blade has been inserted within its receiving slot, the small end 83 of the blade enters the narrowed width portion 82 of the slot which stops further movement of the blade within the slot, the wall bounding the slot 81 may be staked or upset, or bonding material may be placed at this zone for maintaining the blade within the slot. It is evident, however, that the blade will not move perceptibly as long as the threaded stud is passed through the opening 87 thereof.

Referring now specifically to FIGURES 14 to 16, inclusive, I have shown a structure wherein the holder body is chambered for the reception of weighted material, and which body incorporates the features detailed in FIGURES 9 to 13, inclusive, that is to say, in the use of a blade for holding the nut and spring in a cage. In this particular instance, the holder body is provided with a shell 100 which surrounds the structure best shown in FIGURE 15. The structure of FIGURE 15 is formed in two parts, 101 and 102, which parts are adapted to be joined together, as hereinafter detailed. Part 101 has a pair of cylindrical portions or posts 103 and 104 which are integrally formed, part 104 being of greater diameter than the portion 103. The portion 104 is provided with a socket or bore 105, of angular form, that is to say, square, or of any other geometrical figure other than round and which bore functions as a cage. The portion 104 is provided with an annular end flange 106 normal to the axis of the portions 103 and 104, the outer face of said end flange being provided with an end socket 107 functioning as a seat for the tip, and which flange 106 is provided with a depending circular flange 108, spaced inwardly from the peripheral edge of flange 106 a distance so as to accommodate an end of the shell 100 so that the periphery of the shell is in flush relationship to the periphery of flange 106. Flange 106 is provided with a diametric slot 109 of uniform width and of reduced width at 110. Post portion 103 carries a diametric sleeve or socket portion 111, closed at one end 112 and open at the opposite end, the shell 100 likewise having an opening so that the shaft end 113 of the handle may be received within the socket, with the ferrule 114 on said shaft bearing against the periphery of the shell, as shown. Secured to the sleeve or socket 111 and in axial alignment with the portion 103, is an annular flange 115. The portion 102 is identical in construction with that portion which has been shown secured to part 103, that is to say, it is provided with a bore of irregular outline, similar to that shown at 105, the flanges 106 and 108, with the seat portion or socket at 107 and the slots 109 and 110 and, accordingly, this portion will not be detailed further. However, portion 102 is provided with a reduced diameter axial stud 116 adapted to be received in the annular flange 115, ends of the flange seating against the end of member 102, as shown at 117. These parts may be held in working relationship by means of a bonding material received in complementary annular grooves of said members, as shown at 118. The shell 100 engages and surrounds the flange portion of member 102, as illustrated in FIGURE 14. A blade or blades 119, similar to the blade shown in FIGURE 13, is adapted to hold a coil compression spring and a nut within the irregular shaped bores 105, for both ends of the structure of FIGURE 15. It is evident that there is considerable space included between the members 101 and 102 and the said shell 100, and this space may be filled with weighted material 120.

In FIGURES 17 to 20, inclusive, I have illustrated a form of hammer which may be fabricated easily and cheaply and is of the non-rebound type. The assembly may be a permanent one and the parts may be cast. In this instance, the holder body may be formed from metal, such as zinc or aluminum, depending upon the weight desired, and which incorporates the advantages of easy removal and replacement of the tips. In this instance, the holder body may comprise a casting 130 of sleeve form and with the inner wall 131 in slight angularity to the cylindrical outer wall. The inner wall converges from end 132 toward transverse end or base plate 133, spaced inwardly from the outer end 134 to provide a body seat 135. This shell is provided with a transverse bore 136 through which one end of the handle shaft is passed, as hereinafter detailed, and the plate 133 is provided with a central bore 137, which plate, at the bored portion, is reinforced by an inner flange 138.

Adapted for reception within the sleeve or shell is the member shown in FIGURE 20. This member is characterized in that it is provided with an end plate 139 formed with a socket 140 functioning as a body seat portion for a tip. This plate, like plate 133, has a central bore corresponding to bore 137 and a surrounding flange, corresponding to flange 138. A tubular post 141 is cast, or otherwise formed, centrally of plate 139, and said tubular post is angular-sided and, in the present instance, substantially square, as shown in FIGURE 18. Assuming the tubular post to be of square section, opposite parallel sides of said post carry sleeves 142 and 143 of elliptical or oval section for receiving the end of a shaft 144, which shaft passes directly through the tubular post, as shown in FIGURE 17. The ends of said sleeves 142 and 143 are inclined so as to fit within the inclined or tapered wall surface 131 of the shell 130 (see FIGURE 17). In addition, the parallel sides of the tubular post are provided with upper and lower aligned wings 145, 146, 147 and 148, which are in substantially right angular relationship to the said sleeves 142 and 143. Ends of these wings are beveled or tapered so as to fit within the sleeve or shell 130.

The tips are provided with the structure of FIGURE 8, and there are likewise provided the nuts and compression springs to complete the assembly. Either a shaft sleeve or two small plates may be received within the tubular post on opposite sides of the shaft to function as limiting bases for the coil springs. The sleeve or shell may be partially filled with weighted material, after which the member shown in FIGURE 20 may be inserted within the shell, it being assumed that the holder shaft is already received within the sleeves 142 and 143, followed by placing the tips in position of service to their seats 135 and 140. The two parts of the holder body, that is, the parts shown in FIGURES 19 and 20, may be secured together by bonding material, and the shaft end of the handle may be likewise bonded within the sleeves 142 and 143.

It is evident that the operation and method of forming, as well as fabricating and assembling the several hammer forms will be clear from the description just given. However, all forms of the hammer have certain features in common. By this, I refer to the tips with their embedded heads carrying threaded studs for engagement with nuts confined within cages under pressure from compression springs so that the nuts actually float and no mutilation of the threads of the studs results upon any looseness of the heads relative to the body seats of the hammer resultant upon percussion. In the several embodiments, I have illustrated various means whereby the body is formed to hold the nut and spring within the cage, such as by the blade construction shown in FIGURE 13. The internal construction of the holder body may vary, depending on whether or not the holder body is constructed in such a manner as to not have a rebound. In this case, the form might be any one of several, such as shown in FIGURES 2, 6, 14 and 17.

I claim:

1. A hammer, including: a body, said body having a sleeve, and a cap closing an end of said sleeve, said cap provided with an end socket, a tip provided with an abutment for reception within said end socket of the cap and means for securing the tip to said cap, said means comprising, a cage secured to the cap, a nut within the cage, resilient means normally urging the nut in one direction within the cage, a threaded stud anchored within said tip and projecting beyond the abutment for engagement with the nut within the cage, the spacing between the cage and the stud being such that the stud does not bottom within the cage when the tip is fully seated within the socket of the cap.

2. In hammer construction, a body formed with a socket seat, a shaft secured thereto, and a tip for said body; said tip having a striking face and a seat portion for reception within the socket seat of the body; means for detachably securing said tip to the body; said means comprising a cage within and secured to the body, a nut within said cage, said nut and said cage being angle sided to provide a non-revolvable relationship, a coil spring within the cage for constantly urging the nut toward the seat portion of the body, and a threaded stud projecting from the seat portion of said tip for engagement with the nut to normally hold the nut tightly upon the stud to maintain the seat portion of the tip within the socket seat against relative separation.

References Cited in the file of this patent

UNITED STATES PATENTS

| | | |
|---|---|---|
| 1,045,145 | Hubbard | Nov. 26, 1912 |
| 2,601,294 | Jahn et al. | June 24, 1952 |
| 2,604,914 | Kahlen | July 29, 1952 |